Feb. 2, 1960   R. M. YOUNG   2,923,156
LIQUID LEVEL INDICATING MECHANISM
Filed Oct. 30, 1957
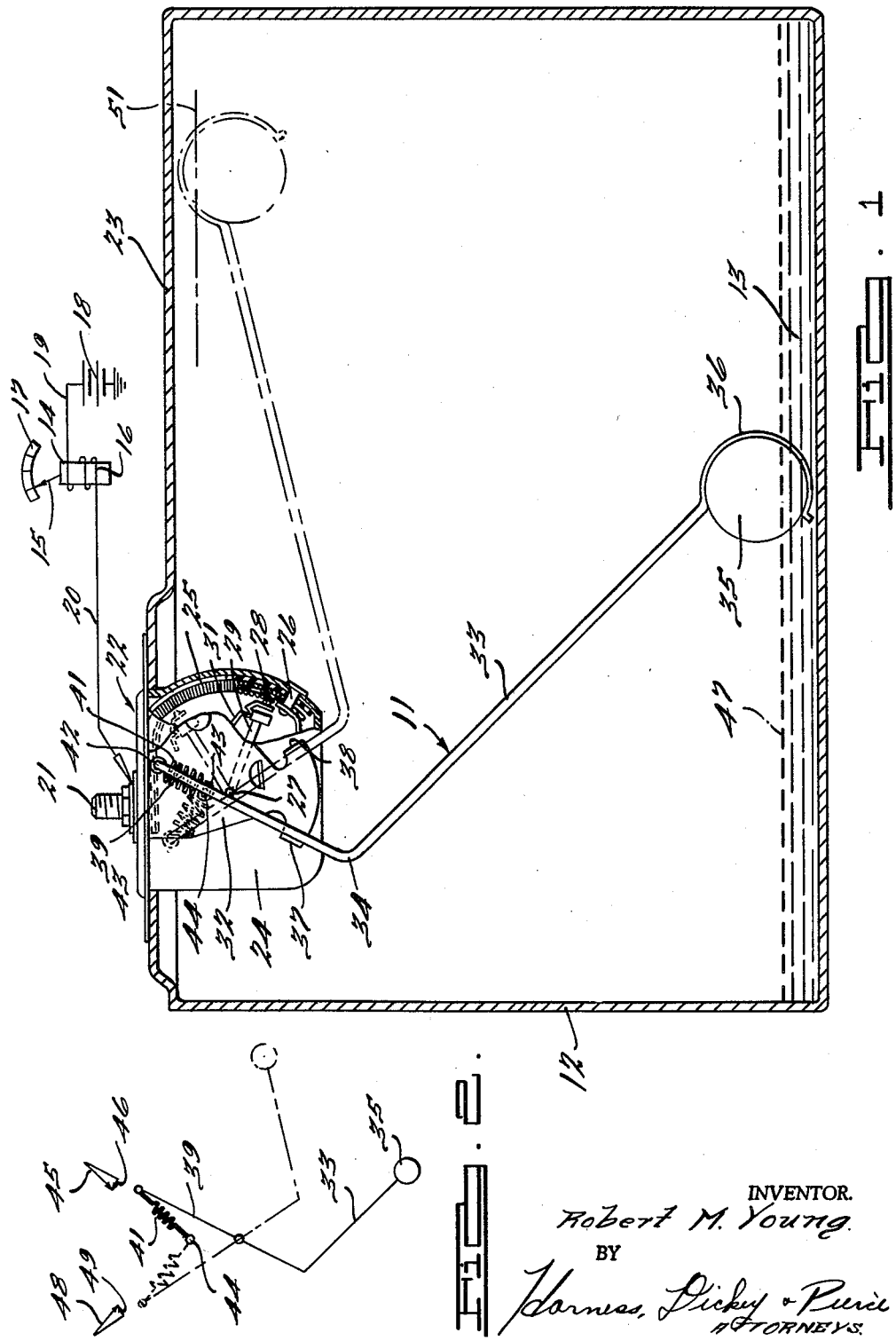
INVENTOR.
Robert M. Young
BY
Harness, Dickey & Pierce
ATTORNEYS.

United States Patent Office 2,923,156
Patented Feb. 2, 1960

2,923,156

LIQUID LEVEL INDICATING MECHANISM

Robert M. Young, Ann Arbor, Mich., assignor to King-Seeley Corporation, Ann Arbor, Mich., a corporation of Michigan Application October 30, 1957, Serial No. 693,315

2 Claims. (Cl. 73—313)

This invention relates to liquid level indicating mechanisms, and more particularly to the construction of floats in containers such as vehicle gasoline tanks which are connected with an indicator to show the instantaneous level of liquid in the container.

In the construction of floats of this type, problems have been encountered with respect to interference between the float itself and the upper and lower walls of the container, engagement of the float with these walls causing difficulty in obtaining maximum use of the container and indicator. Commonly, such floats are of cylindrical or spherical shape and are mounted at the end of a pivoted arm, the float tending to position itself at the liquid surface so that about half of its area is exposed while the other half projects below the surface. When the container, such as a vehicle gas tank, is filled, the float will thus engage the top of the gas tank before the tank has been completely filled, and there is no way of indicating the capacity above this level. As the gas tank becomes empty, the conventionally mounted float will engage the bottom of the tank when considerable fuel still remains. Although it is of course desirable to have a reserve supply of gas when the gauge is in its "empty" position, the diameter of the usual float is such that considerably more fuel will remain in the tank when the float touches the tank bottom than is necessary under most driving conditions. Furthermore, the normal vehicle vibrations which occur during driving will cause the float to bounce against the tank bottom when the fuel supply is low, thus making it difficult to obtain a reliable reading of a gauge.

It is an object of the present invention to overcome the aforementioned difficulties and to provide a novel and improved float construction for use with liquid level gauges which will be capable of functioning through a substantially wider range of fuel levels than has heretofore been possible, thus enabling a calibrated gauge to indicate accurately the amount of liquid even when the container is nearly full or nearly empty.

It is another object to provide an improved float construction of this nature which is usuable in conjunction with a variety of electrical or mechanical indicators.

It is also an object to provide an improved liquid level mechanism of the above character which is of extremely simple construction, is economical to fabricate, and has a minimum of parts which would require maintenance.

Other objects, features, and advantages of the present invention will become apparent from the subsequent description, taken in conjunction with the accompanying drawings.

In the drawings:

Figure 1 is a partially schematic elevational view, portions being sectioned, showing the novel liquid level float construction of this invention mounted in a liquid container and connected to an electrically operated indicator; and Figure 2 is a diagrammatic view showing the principles of construction of the invention.

In general terms, the invention comprises a pivoted arm at the outer end of which is mounted a float, the arm being adapted to be mounted in a liquid container and having means connected thereto which urges the arm in one direction when the container is nearly full and in the other direction when the container is nearly empty. More specifically, the arm is engageable by spring means which are so arranged that the arm will be yieldably restrained from moving in either direction from its intermediate position, the restraining force increasing gradually as the arm moves further in either direction from its central location. The force of the spring means is so selected that when the float reaches the nearly full position, it will be almost totally submerged in the liquid but will still be responsive to liquid level changes. Likewise, when the liquid level is nearly at the bottom of the container, the spring means will hold the float almost completely out of the liquid, with sufficient volume of the float remaining in the liquid to cause the arm to respond to liquid level changes.

Referring more particularly to the drawings, the float mechanism is generally indicated at 11 and is adapted to be mounted in the interior of a liquid container 12 which may, for example, be a vehicle tank holding gasoline 13. In the illustrated embodiment of the invention, the float mechanism is adapted to be used in conjunction with an electrical liquid level indicator shown schematically at 14, this indicator having a pointer 15 controlled by an electrical coil 16 which moves along a calibrated dial 17. Pointer 15 is adapted to be moved from an "empty" position at the left-hand end of scale 17 to a "full" position at the right-hand end of the scale, increases in current of coil 16 causing pointer 15 to move progressively to the right. Coil 16 is connected to a battery 18 by a conduit 19, and the other end of the coil is connected by a conduit 20 to a terminal post 21 of a signaling unit generally indicated at 22 which is mounted on the top 23 of tank 12 and extends into the tank.

Signaling unit 22 comprises a housing 24 which contains a wound wire rheostat 25, one end of this rheostat being connected to terminal post 21 while the other end is secured to the housing by a fastener 26. A pivot rod 27 is mounted in a central portion of housing 24 and carries a sliding contact 28 on an arm 29. This contact engages rheostat 25 and is grounded by a grounding strip 31 which extends around rod 27 and is secured to pin 26. It will therefore be seen that movement of sliding contact 28 from its lower position as shown in solid lines in Figure 1 to its upper dot-dash line position will cause an increase in current through the circuit, thus moving pointer 15 from its "empty" to its "full" position. It should be understood that the circuit shown schematically in Figure 1 is greatly simplified and is not intended to represent an actual vehicle circuit or to restrict the concept of the invention as set forth below.

Mounted adjacent housing 24 is a bracket 32 which extends downwardly into tank 12 and supports the other end of pivot rod 27. Secured to this end of the pivot rod is a float lever 33 which forms part of novel float mechanism 11. Lever 33 is angularly bent at 34, and a cylindrical float 35 is secured to the outer end of the lever which is in the form of a rod having a portion 36 partially encircling the float. Bracket 32 has a pair of stops 37 and 38 within which an intermediate portion of lever 33 is disposed, these stops limiting movement of the lever in both directions.

Lever 33 has a portion 39 extending in the opposite direction from pivot rod 27, and a helical tension spring 41 is secured at one end 42 to the outer end of portion 39. The other end 43 of spring 41 engages a pin 44 fixed to bracket 32. The location of pin 44 is such that a line passing through pivot rod 27 and spring end 42 will be to one side of pin 44 when float 35 is in its lowest position, as shown in solid lines in Figure 1, and will be on the other side of pin 44 when the float is in its uppermost position as shown in dot-dash lines. This imaginary line will pass through pin 44 when float 35 is in an intermediate position approximately halfway between its two extreme positions.

The operation of the device may perhaps best be understood with reference to Figure 2, which shows in diagrammatic form the forces exerted by spring 41 on float lever 33 in the two extreme positions of the float. It should be undertsood that the relative dimensions of the parts in Figure 2 are deliberately exaggerated in order to show the principle of operation more clearly. When float lever 33 is in the solid line position of Figure 2, that is with float 35 in its lowermost position, lever arm 39 will extend to the right of pin 44, and the subsequent tensioning of spring 41 will cause a force to be exerted in the direction of arrow 45. This force will have a component at right angles to lever arm 39, this component being indicated by arrow 46. Force component 46 will thus exert a moment force on lever 33 tending to lift float 35 from liquid 13. The strength of spring 41 is so selected that in the extreme position shown in solid lines in Figure 2, force 46 will be just sufficient to lift most but not all of float 35 from liquid 13, leaving a small volume of the float still below liquid level 47 as indicated in Figure 1. When the float is in its uppermost position, as shown in dot-dash lines, spring 41 will exert a force 48 on lever arm 39 due to the fact that this lever arm is now to the left of pin 44. Force component 49 of force 48, which is transverse to lever arm 39, will exert a moment force on lever 33 tending to force float 35 downwardly into the liquid which is now at the level indicated at 51 in Figure 1. Here again, the spring strength is so selected that most but not all of float 35 will be under level 51.

It should be noted that since approximately half of float 35 will be above the liquid level when the float is halfway between its extreme positions, and since spring 41 is progressively tensioned as the lever moves in either direction from this intermediate position, the degree to which float 35 is lifted out of or forced down into the liquid will increase gradually and not discontinuously as the lever moves to one extreme position or the other. Because of this fact, scale 17 of the liquid level indicator may be accurately calibrated to indicate liquid level throughout the range between liquid levels 47 and 51. Depending upon the shape of tank 12 and the general geometry of the system, further calibration or adjustment could be made by properly shaping rheostat 25 or varying the spacing of turns on the core. It will also be noted that the novel float arrangement could be used with other types of indicators than the electrical arrangement shown in the drawings. With the improved construction, continuous indications of liquid level will be possible within a substantially wider range than would be the case if float 35 remained in the same position with respect to the liquid level throughout its range of movement.

Other objects, features, and advantages of the present invention will become apparent from the subsequent description, taken in conjunction with the accompanying drawings.

What is claimed is:

1. In a liquid level indicating mechanism, a bracket adapted to be mounted within a liquid container, a pivot rod rotatably mounted on said bracket, a float lever fixed to said pivot rod, said lever having arms extending in opposite directions from said pivot, a float mounted at the outer end of one of said arms said float being movable from an intermediate position in opposite directions in response to changes in the liquid level in said container, and a helical tension spring alongside said other lever arm and connected between the outer end of said other lever arm and a fixed point on said bracket, said fixed point being on one side of said other lever arm when the float is raised from its intermediate position and on the other side of said other lever arm when the float is lowered from its intermediate position, whereby said spring will exert a moment force on said lever tending to lower the float when raised from its intermediate position and tending to raise the float when lowered from its intermediate position.

2. In a liquid level indicating mechanism, a pivot rod adapted to be mounted in the upper portion of a liquid container, a sliding contact extending to one side of said pivot rod and movable therewith, a rheostat mounted at one side of said pivot rod and engageable by said contact, a float lever secured to said pivot rod having an inner arm which is generally vertically disposed and an outer arm bent angularly from said inner arm, a float secured to the outer end of said outer arm, a helical tension spring alongside said inner arm, one end of said spring being secured to the upper end of said inner arm, and a fixed point on said bracket securing the other end of said spring, said fixed point being on one side of said inner arm when the float is above its intermediate position and on the other side of said inner arm when the float is below its intermediate position, whereby said spring will exert a moment force on said lever urging said float in a direction opposite to its direction of movement.

References Cited in the file of this patent

UNITED STATES PATENTS

| | | |
|---|---|---|
| 2,369,027 | De Giers | Feb. 6, 1945 |
| 2,623,392 | Howe | Dec. 30, 1952 |
| 2,627,178 | Hayward et al. | Feb. 3, 1953 |
| 2,752,783 | Fauvelot | July 3, 1956 |